United States Patent Office 2,818,265
Patented Dec. 31, 1957

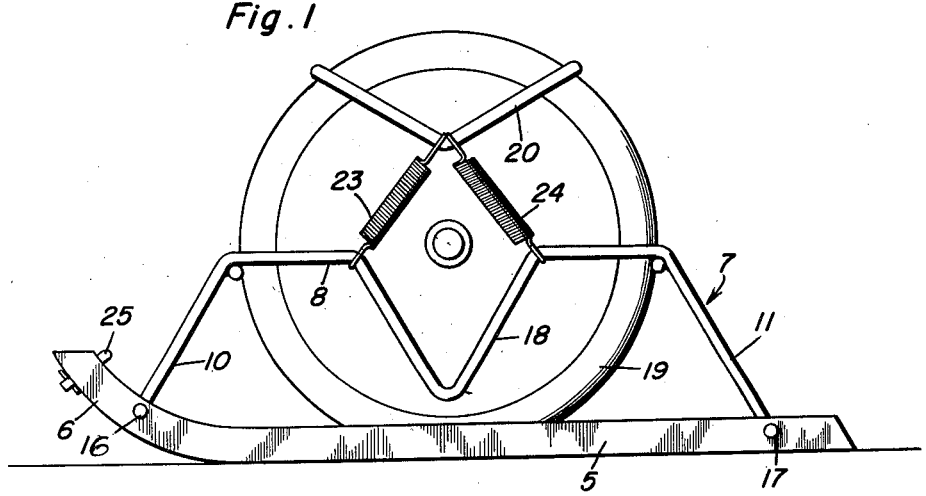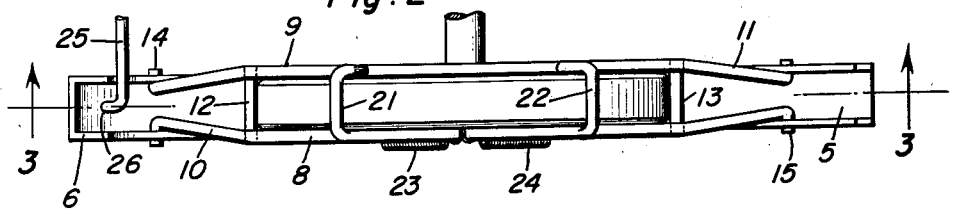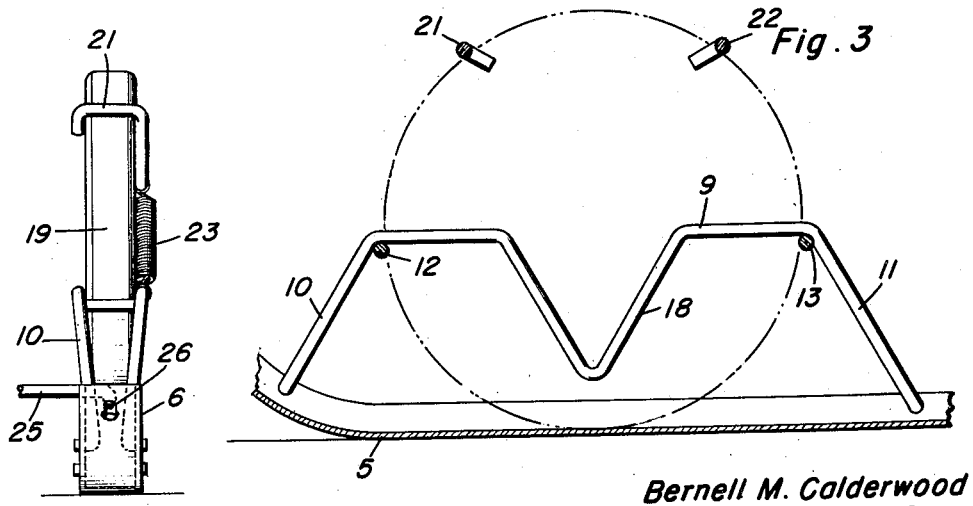

2,818,265

RUNNER ATTACHMENT FOR WHEELS

Bernell M. Calderwood, Salt Lake City, Utah

Application March 5, 1956, Serial No. 569,504

1 Claim. (Cl. 280—13)

The present invention relates to new and useful improvements in runner attachments for the wheels of children's vehicles or for the wheels of vehicles generally, to convert the vehicle into a sled for traveling on snow or ice.

An important object of the invention is to provide an easily attachable runner for the wheels of a vehicle which may be quickly placed in position or removed from the wheel without the use of tools, and without necessitating alterations or changes in the construction of the wheel.

Another object is to provide a wheel attached runner with a knockdown wheel attaching frame and clamp constructed to firmly embrace the sides, front, rear and top of a wheel, and whereby the device may be stored or carried in a compact form when not in use.

A further object is to provide a device of this character of simple and practical construction, which is strong and durable, relatively inexpensive to manufacture, and otherwise well adapted for the purpose for which the same is intended.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1 is a side elevational view;

Figure 2 is a top plan view;

Figure 3 is a vertical sectional view taken on a line 3—3 of Figure 2; and

Figure 4 is an end elevational view.

Referring now to the drawing in detail, wherein for the purpose of illustration I have disclosed a preferred embodiment of my invention, the numeral 5 designates a runner of channel shape in cross-section and having an upwardly curved front end 6.

A frame 7 is composed of a pair of spaced-apart substantially parallel side bars 8 and 9 having downwardly extending end portions to form pairs of front and rear legs 10 and 11. Cross bars 12 and 13 are welded at the junction of the front and rear legs with the bars to rigidly connect the bars to each other.

The pairs of front and rear legs are formed with outwardly projecting trunnions 14 and 15 respectively, and the legs are sufficiently resilient to flex for snapping the trunnions in front and rear openings 16 and 17 in the opposing flanges of the runner to connect the frame thereto.

The central portion of the bars 8 and 9 are bent downwardly into a V-shaped portion, as shown at 18.

A wheel 19 of a vehicle is placed in the frame 7 between the side bars 8 and 9 to rest in the channel of the runner 5 and the runner and frame are constructed of proper size for tightly fitting the wheel therein with a minimum of play and with the tread or periphery of the wheel bearing against the front and rear cross bars 12 and 13.

A substantially V-shaped clamp 20 of rigid bar material is formed at its end portions with inwardly projecting hooks 21 and 22 for engaging the upper portion of the wheel and a pair of coil springs 23 and 24 connect the clamp to the side bar 8 at an adjacent side of the wheel to subject the clamp to spring tension for retaining the latter in position on top of the wheel and to retain the runner and frame in assembled relation at the lower portion of the wheel.

The V-shaped central portions 18 of the side bars 8 and 9 positioned at the lower portion of the opposite sides of the wheel tend to reduce relative lateral movement of the wheel and frame and which together with the clamp 20 tend to maintain the runner in rigidly assembled position on the wheel.

Where the vehicle is equipped with swivel or caster type front wheels, a cross rod 25 may be inserted in openings 26 at the front ends of the runners to maintain the runners parallel to each other.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

A runner attachment for a vehicle wheel comprising a channeled runner member adapted to seat a wheel therein and having sides, a frame rising from said runner member comprising a pair of horizontal side bars adapted to engage opposite sides of a wheel, said bars having depending front and rear legs detachably attached to the sides of the runner member and also having depending central V-shaped portions adapted to engage opposite sides of a wheel, a V-shaped clamp bar for holding a wheel seated in said runner member and having terminal hooks engageable over an upper portion of a wheel and a pair of helical tensioned springs terminally connected at corresponding ends to the apex of said clamp bar and diverging downwardly and terminally connected at their other ends to one of said side bars at opposite sides of the V-shaped portion of said side bar, and cross members connecting said bars together adjacent said front and rear legs and adapted to confine a wheel therebetween against rolling on said runner member.

References Cited in the file of this patent

UNITED STATES PATENTS

| | | |
|---|---|---|
| 878,259 | Walsh | Feb. 4, 1908 |
| 1,218,467 | Rice | Mar. 6, 1917 |
| 1,733,774 | Brye | Oct. 29, 1929 |
| 1,810,042 | Gerth | June 16, 1931 |
| 2,437,672 | Stryker | Mar. 9, 1948 |
| 2,514,470 | Call | July 11, 1950 |
| 2,589,602 | Clark | Mar. 18, 1952 |